United States Patent [11] 3,620,828

[72] Inventors Fritz M. K. Werdouschegg
 New Brighton, Minn.;
 Robert H. Windhager, Pittsburgh, Pa.
[21] Appl. No. 28,904
[22] Filed Apr. 15, 1970
[45] Patented Nov. 16, 1971
[73] Assignee Calgon Corporation
 Pittsburgh, Pa.
 Continuation-in-part of application Ser. No. 635,523, May 2, 1967, now abandoned.

[54] PROCESS FOR PRODUCING PIGMENTED ELECTROCONDUCTIVE COATING COMPOSITIONS
 19 Claims, 1 Drawing Fig.
[52] U.S. Cl. .................................................. 117/201,
 117/68, 117/155 UA, 252/500, 204/2
[51] Int. Cl. .................................................. H01b 1/06,
 C09c 5/24, G03g 5/00
[50] Field of Search ........................................ 117/201,
 155 U, 155, 68; 252/500; 260/37 N, 293; 96/1.8;
 204/2

[56] References Cited
 UNITED STATES PATENTS
 3,264,137  8/1966  Gess ............................ 117/201
 3,248,279  4/1966  Geyer .......................... 117/201
 3,160,503  12/1964  Cady ........................... 117/201
 FOREIGN PATENTS
 687,942  6/1964  Canada ....................... 117/201
 1,136,457  12/1968  Great Britain ............... 117/201

Primary Examiner—Alfred L. Leavitt
Assistant Examiner—M. F. Esposito
Attorney—Cushman, Darby & Cushman ABSTRACT: A method of rendering polycationic materials compatible with anionic pigments in coating compositions is disclosed. Pigmented polycationic electroconductive polymer coatings on paper stock are used in direct electrophotographic reproduction machines. Polycationic components and anionic pigments are rendered compatible if the Zeta potential of the pigment is neutralized by the addition of a dilute cationic compound, and the electroconductive polycationic polymer is thereafter added to the pigment dispersion with a high degree of agitation. By following this procedure, the pigment dispersion remains stable, and neither the coated paper nor the dispersion stratifies or develops agglomerates.

ZETA POTENTIALS OF 100ppm CONCENTRATIONS OF COMMON COATING PIGMENTS WITH RESPECT TO INCREASING CONCENTRATIONS OF CATIONIC POLYMER A ----- PURECAL O-CALCIUM CARBONATE
B ----- DACOTE-CALCIUM CARBONATE
C ----- KCS PREDISPERSED KAOLIN CLAY
D ----- LUSTRA KAOLIN CLAY
E ----- COLUMBIA KAOLIN CLAY
F ----- STAR ENGLISH CLAY
G ----- SPECIAL HYDRATEX KAOLIN CLAY
H ----- ULTRA WHITE 90 KAOLIN CLAY

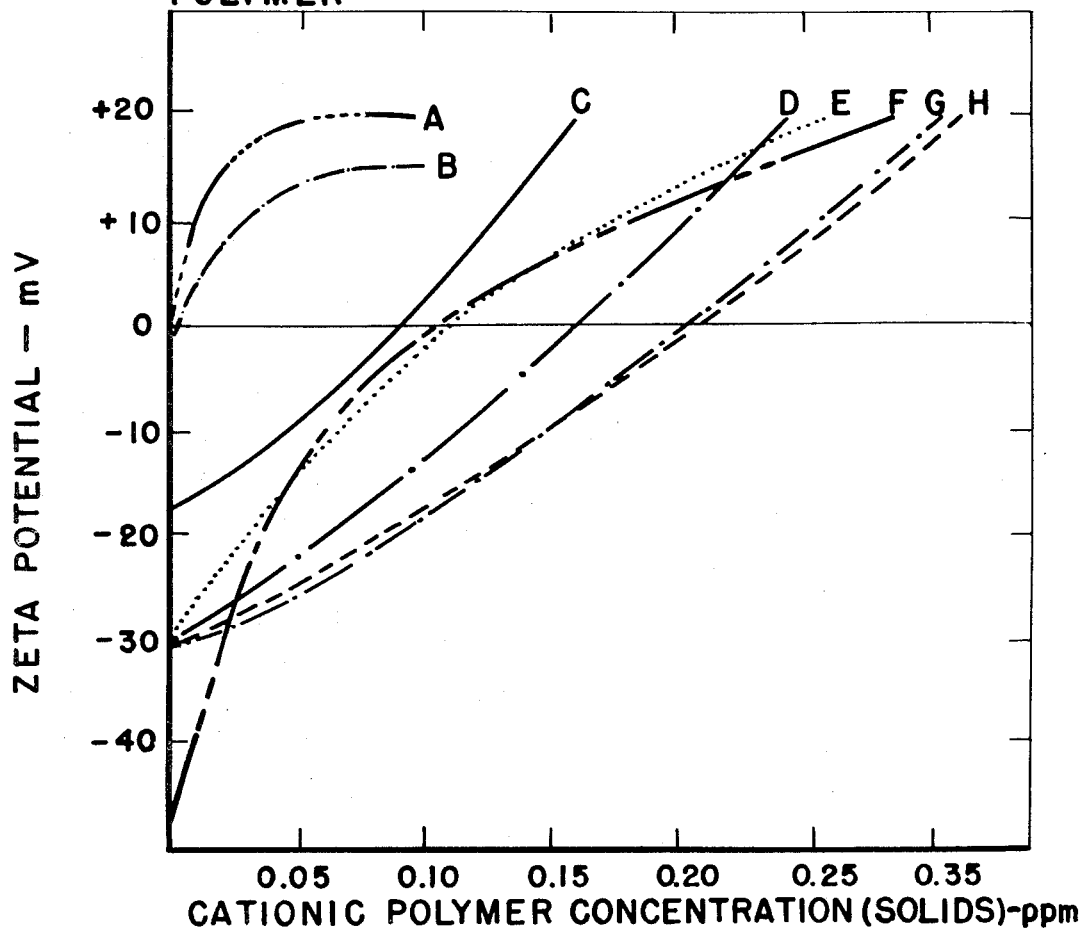

PROCESS FOR PRODUCING PIGMENTED ELECTROCONDUCTIVE COATING COMPOSITIONS

CROSS REFERENCE TO RELATED APPLICATION

This application is a continuation-in-part of our copending application, Ser. No. 635,523, filed May 2, 1967 now abandoned.

BACKGROUND OF THE INVENTION

Since the commercialization of the direct electrophotographic reproduction process in the early sixties, a wide variety of electrophotographic copy machines have been developed and placed on the market. In general, each machine has different requirements for toner systems and sensitized paper, and only a relatively small number of conductive chemicals have been available which are suitable for sensitized paper substrates.

Paper is a poor electrical conductor, especially at low relative humidities. It is important that an electrophotographic copy paper be conductive regardless of humidity conditions, as convenience copy machines may be used in widely differing climates. It is known that substrate conductivity plays a key role in the electrophotographic reproduction process in such elements as governing the rate of corona discharge, determining the rate of dark decay, providing uniform distribution of charge and regulating the effects of developer biasing devices. Polymeric organic chemicals have been used by the prior art as the conductive coating for sensitizing paper substrates. These polymeric organic chemicals are believed to behave as electrolytic conductors, i.e., the mechanism of current flow is ionic rather than electronic. It has been demonstrated that the moisture adsorbed by these hydrophylic chemicals provided charge-carrying sites by dissociation of the water into hydrogen and hydroxyl ions. With a minimum quantity of moisture present, the effective dielectric constant may thus be decreased to below that of the pure polymer.

The water-soluble, linear cationic polymers formed from diallyl quaternary ammonium monomer compounds have been used to provide an electroconductive surface or layer for sensitized papers, as are mainly used in electrostatic copying. Polymers and copolymers made from diallyl dimethyl ammonium halides and diallyl diethyl ammonium halides are typical examples of such water-soluble, linear polymers. Butler Canadian Pat. No. 687,942, issued June 2, 1964, describes such homopolymers, which may also be named a 3,5-methylene-linked piperidinium polymers of the following general formula:

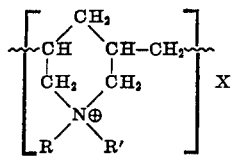

where R and R' represent lower alkyl groups of one to six carbon atoms, preferably methyl or ethyl groups, and X indicates the degree of polymerization. These materials are referred to hereinafter as 3,5-piperidinium polymers. Within this term may be included copolymers having up to about 10 mole percent of groups derived from copolymerizable monoethylenically unsaturated comonomers such as acrylamide, acrylic acid, diacetone acrylamide, acrylonitrile, etc., so long as the resulting copolymers remain water soluble and are therefore capable of coating from water solutions. Also included within this term are copolymers containing up to about 80 mole percent of a second 3,5-methylene-linked piperidinium polymer wherein one or more alkyl groups of up to about 22 carbon atoms, for example, dodecyl, are attached to the heterocyclic nitrogen atom. If desired, relatively very small amounts of cross-linking agents, such as, for example, N,N'methylene bis-acrylamide, may be added to enhance stability of the coating.

Particularly preferred 3,5-piperidinium polymers are homopolymers of diallyl dimethyl and diallyl diethyl ammonium halides, especially chlorides, with a Brookfield viscosity of 250 to about 250,000 cps. and especially with a Brookfield viscosity (LVF,bob 4, 6 r.p.m.) of 10,000–15,000 cps.

While such polymers have been found to be of great value as electroconductive coating agents, it has also been the experience of users of the 3,5-piperidinium polymers that many various common anionic components used in paper coating compositions appear to be incompatible with them. Many anionic pigments, for example, are especially troublesome. Coating preparations containing the same are extremely difficult to obtain and are unstable. Papers coated with such preparations fail to have satisfactory characteristics. Compatibility of coating components is generally determined by observing the coating preparations for uniformity and absence of precipitates or agglomerates.

BRIEF DESCRIPTION OF THE INVENTION

This invention relates to a method of rendering polycationic materials compatible with anionic pigment components in paper coatings. In particular, it relates to pigmented coatings containing polycationic 3,5-piperidinium polymeric compounds which are used to render paper electroconductive, and a method of use thereof whereby such polymers are rendered compatible with the anionic pigments. The multipurpose conductive coatings so produced may be applied to paper substrates to form electrophotographic reproduction process paper (sensitized papers), while avoiding deficiencies resulting from applying separate coatings of conductive polymers and incompatible components. To achieve this, it is necessary that the Zeta potential of the anionic pigments is neutralized by the addition of a cationic material, and the polycationic material is thereafter added with vigorous stirring, with no indications of coating preparation incompatibility.

GENERAL DESCRIPTION OF THE INVENTION

It has been found that in preparing a paper-coating composition, if the Zeta potential of anionic pigments and other anionic components of the composition is first neutralized by the addition of a dilute cationic material, such as a cationic polymer, the 3,5-piperidinium polymer may be added with moderate to high agitation to the neutralized composition without interfering with the stability thereof. The resulting paper-coating composition, having excellent storage characteristics with little or no stratification or formation of agglomerates, may thus be used to produce electroconductive coated papers.

The Zeta potential of, for example, an aqueous suspension of kaolin clay or other coating composition pigments, is negative and is entirely unrelated to molecular dissociation or ionic charge, as is well known in the art. Although the Zeta potential is not ionic in character, it nonetheless may be neutralized by the cationic (dissociation) charges of a cationic material especially a cationic polymer, that is, of one having cationic charges on its chain, due to the dissociation of its more mobile anionic component. This is reviewed in detail in (57) paper by Sennett, P. and Olivier, J. O., "Colloidal Dispersions, Electrokinetic Effects and the Concept of Zeta Potential," *Industrial and Engineering Chemistry* (57) 8:32 (1965), the disclosure of which is hereby incorporated by reference.

This Zeta potential exhibited by pigments and other anionic paper-coating components may be readily neutralized by the addition of a relatively dilute solution of a cationic compound. Polycationic polymers are particularly preferred for the neutralization of the Zeta potential. The Zeta potential of pigments and the like may be neutralized by the careful addition of the cationic material until the Zeta potential of the pigment suspension is zero, or enough cationic material may be added to produce a positive Zeta potential for the suspension or slurry. The use of low solids, or a high degree of dilution, of the cationic material allows quick dilution and dispersion in the anionic pigment slurry. The higher the solids content of the pigment slurry or other anionic system, the lower the concentration of the neutralizing cationic material must be.

Most commonly used clays carry a pronounced negative charge, although some are close to zero, and, therefore, the present invention is of great value in the formulation of coating compositions based upon polycationic polymers and clay pigment components. As far as is known, the incompatibility between the cationic polymer and anionic pigments and clays have previously precluded prior art use of such systems. Of especial importance is the production of coatings for paper to be used in electrophotographic machines.

Any cationic material may be used to neutralize the Zeta potential of the anionic component, although polycationic materials are particularly preferred because of greater efficiency. As previously mentioned, it is critical that (1) the Zeta potential of the anionic paper-coating components be neutralized (2) by the addition of a dilute solution of a cationic material, and (3) the polycationic electroconductive material be added to the neutralized coating composition subject to moderate to high agitation.

It is generally preferred to add sufficient cationic material to produce a positive Zeta potential of the "neutralized" pigment suspension, in order to ensure that the Zeta potential of the anionic components will be completely neutralized. However, it should be understood that the term "neutralized," when used in the present application, is to include the changing of a negative Zeta potential to a value of zero or above, i.e., to a positive value. In fact, experimental evidence has suggested that it is sufficient, in the case of anionic pigments with a high negative Zeta potential, to neutralize the Zeta potential only to the neighborhood of $-10$ mu. or more. The Zeta potential of neutralized anionic pigments can have a very high positive value but it is preferred that the neutralized pigments have a Zeta potential of no greater than about $+20$ mu. as otherwise too much dilution water may be added to the system. Also, other anionic components, such as latexes, may become incompatible with such highly positive Zeta potential pigment suspensions. Clay pigments are generally supplied in the form of dry solid powders or as 70 percent aqueous slurries, and the slurries are generally diluted with additional water prior to the use thereof. In some instances, however, the pigment slurry concentration may be as high as 80 percent solids. The higher the pigment slurry concentration, and the greater the negative Zeta potential of the pigment, the greater the amount of care is required in the preparation of the coating preparation. In general, the slurry is neutralized with an aqueous solution of a polycationic compound of from about 0.1 to about 20 percent by weight solution concentration. Generally, it is preferable to reduce the concentration of the polycationic compound solution when the polycationic compound has a very high cationic activity (a large number of cationic charge carrier sites per molecule). For most commercial applications the polycationic compound solution concentration will be from about 0.1 to about 15 percent by weight. Preferably, the neutralizing polycationic compound solution concentration is within the range of 0.1 to 10 percent by weight, most preferably 0.5 to 2.5 percent by weight. The lower the concentration of the pigment slurry, the higher the concentration of the neutralizing polycationic compound may be. In the case of neutralizing a high solids pigment slurry, e.g., 70 percent solids, the neutralizing polycationic compound solution should be of a low or quite dilute concentration, e.g., generally 2½ percent solids or less. Mixtures of polycationic compounds may be used.

The low solids content of the cationic neutralizing material allows the rapid dispersion of the same into the pigment slurry. It is possible that some relationship between pigment slurry concentration, neutralizing cationic concentration and total system solids exists but such a relationship has not been definitely established.

The neutralizing cationic solution concentration may be considerably less than the ranges previously mentioned, but it is generally considered undesirable to add too much water of dilution to the system, as such water must subsequently be removed from the coating, and, therefore, the cationic concentration will seldom be below 0.1 percent solids by weight.

Broadly speaking, any cationic material may be used to neutralize the Zeta potential of anionic components. For example, $Na_2CO_3$ or alum may be used for the Zeta potential neutralization. However, polycationic polymers are particularly preferred for the Zeta potential neutralization as much less of such polycationic polymer need be used, per weight basis as compared to, for instance, $Na_2CO_3$. Any polymeric material containing a plurality of cationic sites may be utilized to neutralize the Zeta potential of anionic pigments. In fact, dilute solutions of the 3,5-piperidinium polymer may be used to neutralize anionic pigments or any other anionic component Zeta potentials. Polyamine compounds, such as polyethylene amines, have been found to be quite effective in Zeta potential neutralization, as have polymers containing a plurality of quaternary ammonium groups. By cationic polymers or polycationic polymers the present application refers to polymers containing a plurality of positive ions on the polymeric chain. Such polycationic polymers are well known to the art.

It will be appreciated that, in all cases, a nonflocculating amount of polycationic polymer will be used to neutralize the Zeta potential of the anionic pigments. As mentioned above, a 3,5-piperidinium polymer will normally flocculate anionic pigments, and, in fact, such polymer has been used by the art as a flocculating additive to flocculate clays from aqueous suspensions. It will be appreciated that in the present invention, only a portion of the total amount of the 3,5-piperidinium polymer which is ultimately contained in the electroconductive coating will be used to neutralize the anionic pigment Zeta potential. The Zeta potential neutralizing 3,5-piperidinium polymer must be in a dilute aqueous solution, and must be slowly and carefully added, with high mixing, to the anionic pigment slurry. When a 3,5-piperidinium polymer is used as the Zeta potential neutralizing polycationic polymer, it will normally be of a concentration of no more than 2.5 percent by weight in aqueous solution.

The invention will be more readily understood by reference to the accompanying drawing, wherein the drawing represents a graph illustrating the change in Zeta potential of dispersions of various commercial pigments and clays caused by the addition of the condensation amine polymer described in example 1. The dispersions contained 100 parts per million of suspended pigment or clay. It will be observed from the FIGURE that less than X0.25 parts per million of the condensation amine polymer is needed to neutralize all of the pigments or clays tested to a Zeta potential of about zero or above. For other neutralizing polycationic polymers similar graphs must be prepared to determine the exact amount of neutralizing compound required to obtain about zero Zeta potential of the anionic pigment.

Generally, it has been found preferable to incorporate minor amounts of at least one natural or synthetic binder (mixtures may be used) into the coating system in order to improve solvent and toner holdout of the coated paper. Suitable binders which will be generally used in amounts of about 0.1 to about 50 percent by weight based on the weight of the total coating formulation include, by way of example and not of limitation, modified and unmodified starches, proteins, caseins, SBR latices, polyurethane latices, polyvinyl alcohol, polyvinyl acetate, PVA/PVAc copolymers, and the like, as are known to the art.

The invention will be understood more readily by reference to the following examples. However, these examples are intended to illustrate the invention and are not to be construed to limit the scope of the invention.

EXAMPLE 1

In a beaker, clay (22.3 grams) was mixed with distilled water (16.6 grams) until a uniform, lump-free slurry of about 58 percent solids was obtained. A poly-(ethylene)amine condensation polymer having a molecular weight of about 10,000 (2.5 grams of a 1 percent total solid solution, 25 mg. active) was added into the vortex of the stirred slurry. This quantity of polyamine polymer was sufficient to neutralize the Zeta potential of the clay. No lumping or agglomeration of the clay particle was noted when the polyamine polymer was added. In a second beaker, distilled water (15.0 grams) was mixed with acetylated starch (4.4 grams) until a uniform mixture, which was free of lumps or undispersed particles of about 22 percent solids was obtained. During mixing, the mixture was heated to 95° F. in order to obtain uniformity within a reasonable length of time. Thereafter, a 3,5-piperidinium homopolymer of 20,000 cps. Brookfield viscosity at 25° C. (20 grams of a 38.3 percent active solids solution) was added to the starch with high agitation. The 3,5-piperidinium polymer and the starch were completely compatible and produced a pourable, opaque, smooth, viscous mixture which was free of sediment or agglomerates.

The 3,5-piperidinium/starch mixture was then added to the vortex of the well agitated clay slurry, and the addition was complete within 7 seconds. There was an initial thickening of the clay slurry for about 3 or 4 seconds and the power input to the agitator (Heller mixer) was increased so that no binding of the agitator blades could occur. As soon as the polymer/starch mixture was distributed throughout the clay slurry, an immediate decrease in viscosity was noticed. The slurry became very smooth and free flowing and the power input to the agitator was decreased to avoid splashing.

In a third beaker, distilled water (15.6 grams) and polyvinyl alcohol (3.3 grams of 17 percent by weight Vinol PA-5 solution) were mixed with heating (110° F.) and good agitation until a clear solution was obtained. The polyvinyl alcohol solution was then added to the vortex of the clay slurry/polymer/starch mixture. The final formulation was a smooth uniform coating slurry, free of lumps or sediment, of 38 percent total solids and a pH of 5.5, exhibiting excellent storage and biological stability. (The coating slurry remained "fresh" smelling after prolonged storage at room temperature.)

EXAMPLE 2

The coating slurry produced in example 1 was applied to paper raw stock (Bergstrom Paper Co., Ibsen White No. 1, coating grade raw stock, 46 lb./3300 ft.$^2$) with a 3 mil. Meyer rod. The coated sheets were placed in an oven at 105° C. until dry to the touch. The resultant coated paper was highly useful, after the application of sensitized electrophotographic zinc oxide coatings, in electrophotographic copying. Electrophotographic copy paper produced according to the present invention exhibited good toluene and toner solvent holdout, excellent surface resistivities, and smooth, uniform and nontacky coatings. The finished sensitized paper produced excellent copies in commercial electrophotographic copying machines, utilizing liquid or dry toner systems.

EXAMPLE 3

This example illustrates the difference between using a polycationic neutralizing compound and a compound with a single cationic charge on the molecule as a neutralizing agent. An aqueous slurry of 100 p.p.m. of Montmorillorite clay (Zeta potential of −100 mv.) was prepared. To neutralize this slurry, 1 percent solutions of the cationic neutralizing agents were added. It was necessary to add only 0.85 p.p.m. (active basis) of a N,N-dimethyl 3,5-piperidinium homopolymer of a Brookfield viscosity of 20,000 at 25° C. in order to neutralize the clay slurry to a Zeta potential of zero, whereas 11,300 p.p.m. (active basis) of soda ash ($Na_2CO_3$) was required to obtain the same degree of neutralization. The difference in neutralizing activity amounts to 13,300 percent on a weight basis. While monocationic compounds may be used to neutralize Zeta potentials, obviously polycationic polymers are greatly preferred as much less of the latter may be added to obtain an equivalent degree of neutralization.

EXAMPLE 4

A 60 percent solids slurry of Star English clay which had a measured Zeta potential of about −47 mv., was neutralized by the addition of a 1 percent solution of a poly(ethylene)amine of a molecular weight of about 10,000. No lumping or agglomerating of the clay occurred and enough of the polyamine was added to bring the Zeta potential of the clay up to a value of about +5 mv. The same amount, on an active basis (or solid basis), of a 50 percent solids solution of the same polyamine polymer was added to a second portion of the slurry under otherwise identical conditions. Localized agglomeration of the clay took place, rendering the slurry unsuitable for the subsequent preparation of an electroconductive paper-coating system.

EXAMPLE 5

The neutralized clay slurry of example 4 was used to prepare various electroconductive paper-coating preparations. To the clay slurry was added 4 percent by weight, based on the weight of the total system, of each of the additives listed below:
Polyvinyl alcohols
Polyvinyl acetates
Styrene-butadiene latices
Polyethylene-polyvinyl acetate copolymers
Starches insolubilized with formaldehyde donors
Unmodified starches
Acetylated starches
Hydroxyethyl starches
Enzyme converted starches
Oxidized starches
Alpha proteins X
Domestic caseins
Imported caseins
New Zealand caseins
Argentine caseins In addition, 4 percent by weight (active basis), based on the weight of the total system, of a N,N,dimethyl 3,5-piperidiniumhomopolymer was added to the system with high agitation, using a Heller mixer. Each of the resulting coating preparations was suitable for use in the production of coated electrophotographic copy paper.

The pigmented coating preparations produced by the present invention are used to produce electroconductive sensitized coated papers, and especially papers intended for use in electrophotographic copy machines. Such copy paper is prepared by applying the coating preparation of the present invention by suitable methods, such as, for example, Air-Knife, to suitable base stock paper. The electroconductive polymer coating may be subsequently top-coated with a light-sensitive zinc oxide coating or other suitable top coat. The paper may be coated on one or both sides, as desired. Preferably, the electroconductive coatings are applied to both sides of the paper, with the different sides coated with different concentrations of the electroconductive polymer pigmented coating preparation to produce electroconductive papers having different degrees of surface resistivity on the different sides of the paper. Generally, the zinc oxide coating or other light-sensitive coating will be applied to only one side of the paper. Such a coated paper is superior to the coated papers produced by the prior art in either dry or liquid toner system copy machines. The coating preparation may contain from about 5 to about 70 percent solids and preferably about 25 to 45 percent solids. The 3,5-piperidinium polymer is present in an amount of from at least one-half percent by weight, based on the weight of the total system. In general, the 3,5-piperidinium polymer may comprise from about 1 to 99 percent by weight of the coating preparation solids, and the anionic pigments may vary from about 99 to 1 percent by weight of the preparation solids.

What is claimed is:

1. A process for the preparation of aqueous pigmented electroconductive coating compositions, said compositions containing an electroconductive polycationic 3,5-piperidinium polymer and at least one anionic pigment, said process comprising first neutralizing the negative Zeta potential of a slurry of the anionic pigment by the addition of a dilute aqueous solution of at least one polycationic polymer wherein the minimum concentration of the polycationic polymer in said dilute solution is at least 0.1 percent by weight, and the maximum polycationic polymer concentration is about 20 percent by weight, and thereafter adding the electroconductive polycationic 3,5-piperidinium polymer to the neutralized pigment slurry with moderate to high agitation, thereby forming a pigmented cationic electroconductive coating composition suitable for the preparation of electrophotographic paper.

2. The process as claimed in claim 1 wherein the concentration of said pigment slurry is about 3 to about 70 percent solids by weight.

3. The process as claimed in claim 2 wherein the concentration of said pigment slurry is about 30 to about 70 percent by weight.

4. The process as claimed in claim 2 wherein the Zeta potential of the anionic pigments after the initial neutralization step is at least about zero.

5. The process as claimed in claim 4 wherein the Zeta potential of the neutralized pigment slurry has a positive value above zero.

6. The process as claimed in claim 1 wherein the concentration of the neutralizing polycationic polymer solution is in the range of about 0.1 percent to 15 percent solids by weight.

7. The process as claimed in claim 2 wherein the polycationic polymer is a poly(ethylene)amine.

8. The process as claimed in claim 2 wherein the neutralizing polycationic polymer is a 3,5-piperidinium polymer.

9. A process for producing a pigmented electroconductive paper, said process comprising the steps of (a) neutralizing the Zeta potential of an anionic pigment slurry of about 3 to about 80 percent solids by the addition of a dilute solution of at least one polycationic polymer, wherein the concentration of said polycationic polymer in said solution is from about 0.1 to about 20 percent by weight; (b) thereafter adding an electroconductive 3,5-piperidinium polymer with high agitation to the neutralized pigment slurry to form a coating slurry; (c) applying the coating slurry to a paper base stock; and (d) drying the coated paper base stock, thereby producing coated paper suitable for electrophotographic copy use.

10. The process as claimed in claim 9 wherein the Zeta potential of the anionic pigments after the neutralization step is at least about zero.

11. The process as claimed in claim 10 wherein the Zeta potential of the anionic neutralized pigment slurry is a positive value about zero.

12. The process as claimed in claim 9 wherein the 3,5-piperidinium polymer is a diallyl quaternary ammonium homopolymer.

13. The process as claimed in claim 9 wherein the concentration of said neutralizing polycationic polymer is from about 0.1 to about 15 percent by weight.

14. The process as claimed in claim 9 wherein the concentration of said pigment slurry is about 30 to about 70 percent by weight.

15. The process as claimed in claim 9, including the additional step of adding at least one natural or synthetic coating binder to the coating slurry prior to the application thereof to the paper base stock, wherein the amount of said natural or synthetic coating binder is less than 50 percent by weight, based on the weight of total coating formulation in said coating slurry, whereby solvent and toner holdout of the electroconductive paper is improved.

16. The process as claimed in claim 9 wherein two coating slurries of different concentrations are prepared and applied to different sides of paper base stock, thereby producing electroconductive papers having different degrees of surface resistivity on different sides of the paper.

17. The process as claimed in claim 16 wherein a sensitized zinc oxide coating is applied to at least one side of the coated paper, thereby producing electrophotographic copy paper which may be used in either dry or liquid toner system copy machines.

18. The process as claimed in claim 9, wherein the concentration of said neutralizing polycationic polymer is from about 0.1 to about 10 percent by weight.

19. The process as claimed in claim 9, wherein the concentration of said neutralizing polycationic polymer is from about 0.5 to about 2.5 percent by weight.

* * * * *